United States Patent [19]

Korhonen

[11] 4,389,749
[45] Jun. 28, 1983

[54] CUTTING-UP PROCESS

[76] Inventor: Kaarlo J. Korhonen, Säterivägen 18,, 161 70, Bromma, Sweden

[21] Appl. No.: 219,234

[22] Filed: Dec. 23, 1980

[51] Int. Cl.³ ............................................. A22C 17/02
[52] U.S. Cl. ........................................ 17/46; 17/1 G; 17/52
[58] Field of Search .............................. 17/52, 1 G, 46

[56] References Cited
U.S. PATENT DOCUMENTS
3,811,152  5/1974  Herubel .............................. 17/52 X Primary Examiner—Willie G. Abercrombie
Attorney, Agent, or Firm—Burns, Doane, Swecker & Mathis

[57] ABSTRACT

A process for the coarse cutting-up of a carcass part comprising a limb, such as a shoulder part or a leg part, wherein a primary meat piece is separated from a skeleton portion of the carcass part by making incisions in the carcass part in a pattern adapted for the part while the part is held supported by the foot-end of the limb, the meat piece being cut loose from said skeleton portion while the limb is held rigid at the foot-end against bending, and the meat piece is gripped in the region of the vertically upper portion thereof and is subjected to pulling force away from the carcass part during the cutting loose operation.

9 Claims, 6 Drawing Figures

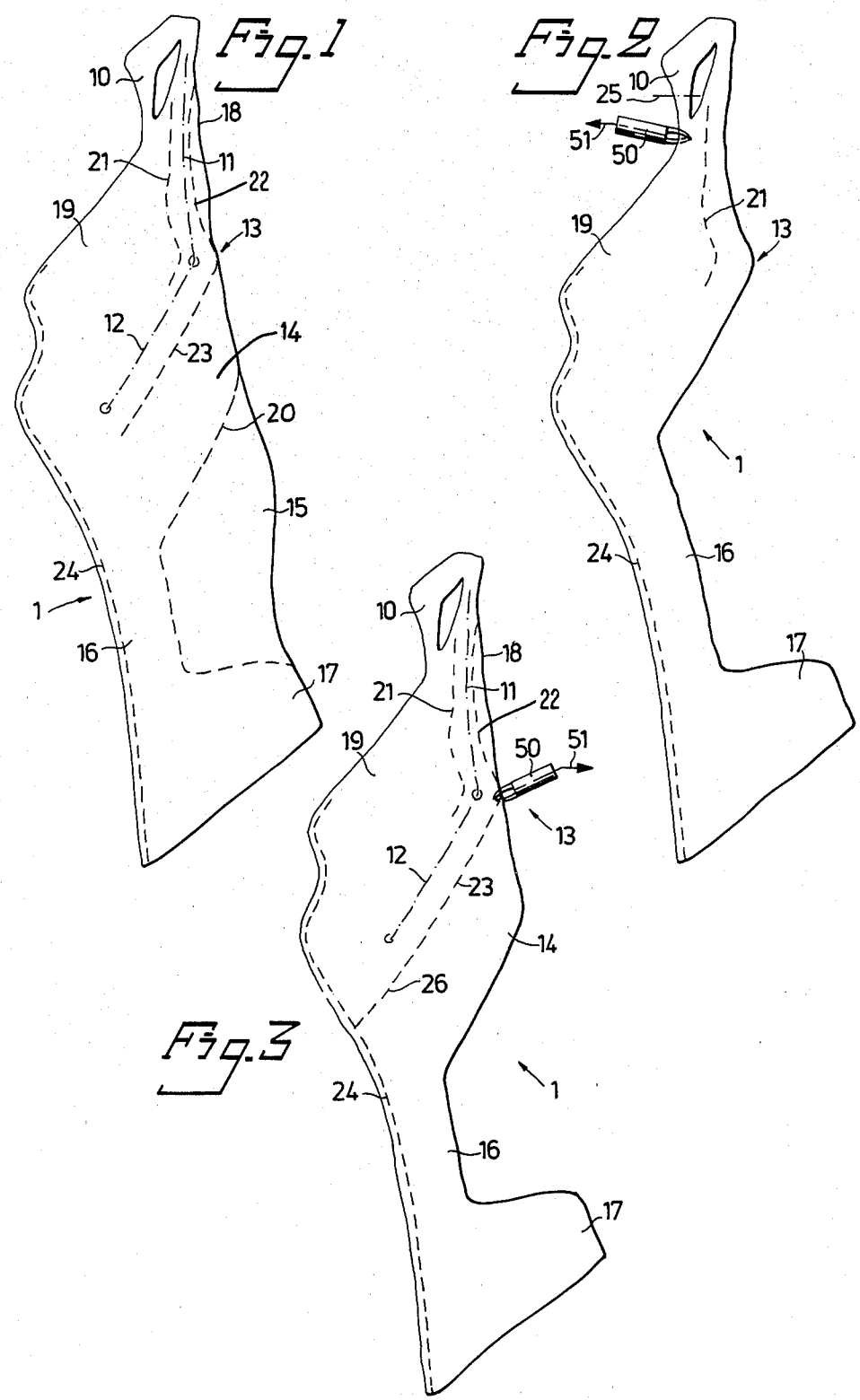

CUTTING-UP PROCESS

TECHNICAL FIELD

The present invention refers to an industrial process for the coarse cutting-up of a carcass part comprising a limb, such as a shoulder part or leg part, comprising separating a meat piece from a skeleton portion of the carcass part.

BACKGROUND

During the coarse cutting-up of e.g. cattle carcasses, the carcass is first cleaved symmetrically along the spine and then each carcass half is separated into two parts, usually between the tenth and eleventh rib. The two resulting carcass parts are supported from an overhead rail system via roller hooks engaged under the Achilles' tendon on the leg part and under the corresponding tendon of the shoulder part.

Prior attempts to simplify and speed up the cutting-up of such carcass parts have involved so called line systems, that is the part has been conveyed in a line past a plurality of cutting-up stations, wherein specific meat parts have been cut away in each separate station. However, such cutting-up is time-consuming and thus costly and also requires lots of space and brings about difficulties regarding further transport of the cut away pieces to final cutting-up stations.

Moreover, in such prior technique it is difficult to change the cutting-up patterns in order to meet changing consumer demands. Furthermore, the prior art technique leaves much to be desired as to ergonometrical work conditions, since the cutting-up is performed as an over-head operation and certain meat parts have to be cut loose as a large piece which has a substantial weight. Thus, the butcher not only has to perform over-head cutting but also has to carry the cut loose meat piece, which is slippery and cold. Moreover, the butcher has to pull horizontally on the meat piece he is cutting loose in order to keep the incisions open to further cutting without damaging the meat piece.

OBJECT OF THE INVENTION

An object of the invention is to propose an industrial cutting-up process in the above indicated art, by means of which the coarse cutting-up of a carcass part is considerably speeded up and simplified.

A further object is to provide better work conditions for the butcher.

A further object is to minimize the space requirement for the cutting-up plant.

A further object is to provide a possibility of easy separation of a primary meat piece from a skeleton portion of the carcass part, and in the extreme case separate substantially the entire meat mass as an integral unit from the skeleton portion, at least in the case of a leg part.

DISCLOSURE OF THE INVENTION

The invention pertains to an industrial process for the coarse cutting-up of a carcass part comprising a limb, such as a shoulder part or a leg part, comprising separating a meat piece from a skeleton portion of the carcass part. On the basis of such a technique the invention is caracterized by incisions being cut in the carcass part in a pattern adapted fo the part while the part is held supported by the foot-end of the limb, the meat pieces being cut loose from said skeleton portion while the limb is held rigid at the foot-end against bending, and the meat piece is gripped in the region of the vertically upper portion thereof and is subjected to pulling force away from the carcass part during the cutting loose operation.

The meat piece may be a primary meat piece. By "primary" is meant a major meat piece which may comprise for example a meat piece comprising e.g. about half the meat mass of the carcass part.

In a preferred embodiment of the invention the incisions are cut at a first work station, the incised hanging part is transferred to a second work station for cutting loose of the meat piece, and the carcass part is rigidly gripped at the foot-end of the limb at the second station.

Said pulling force may be directed toward a conveyor and the meat piece may then be transferred to the conveyor by means of the pulling force. A cattle carcass is normally divided into four parts. In a first step the carcass is cleaved along the spine into two symmetrical parts. These parts are in turn divided, normally between the tenth and eleventh rib, the resulting sub-parts being denoted shoulder part and leg part.

When cutting-up a shoulder part, the skeleton portion, comprising the skeleton of the shoulder part, exclusive of the limb bones, is cut away from the shoulder part before separation of the meat piece from the shoulder part, the skeleton portion being gripped in the region of the vertically upper part thereof, preferably in the longitudinal mid portion of the breastbone, and subjected to a pulling force away from the shoulder part during the cutting away operation. The pulling force is preferably directed toward a conveyor and the skeleton portion is transferred to the conveyor by means of a pulling force.

When cutting up of a leg portion, the incisions are cut along the pelvis bone and the spine projections in a first plane, substantially in parallel with the plane of symmetry, along opposite sides of the shin-bone in a second plane, substantially at right angles to the symmetry plane and along the forward surface of the thigh bone in the second plane. The pulling force is brought to engage the region of the vertically lower attachment of the Achilles' tendon, after which the Achilles' tendon is cut off and the meat piece is cut loose from the skeleton portion of the leg part beginning from above and proceeding vertically downwardly. Moreover, incisions may be cut in the second plane at the rear side of the knee-joint and along the rear side of the thigh bone, and in the second station, an integral meat piece comprising at least the sirloin steak and the roast beef is cut loose, the pulling force being attached to the knee-joint portion of the meat piece, and the cutting loose operation being performed beginning from the knee-joint region and proceeding vertically downwardly. The step of cutting loose the sirloin steak and the roast beef as an integral meat piece may be the first cutting loose operation at a leg part, and the remaining meat mass can then be cut loose as an integral part from the bones of the leg part.

When cutting-up a shoulder part, the incisions may be cut along the spine projections and the breastbone and the neck in a first plane, substantially in parallel with a symmetry plane, along opposite sides of the lower knuckle-bone and the middle knuckle-bone in a second plane, substantially at right angles to the symmetry plane and along opposite sides of the cam-shaped exterior ridge on the shoulder blade in said second plane.

The pulling force may then be attached at the central portion of the breastbone. The breastbone, ribs, spine and neck column are then separated as an integral skeleton portion from the shoulder part. The meat piece thus cut loose from said skeleton portion is then gripped at the breastbone edge in a central area thereof and subjected to the pulling force. The meat piece cut away from said skeleton portion and the meat piece located on the forward side of the middle knuckle-bone are cut loose from the knuckle-bones in an integral unit.

When cutting-up a leg part in accordance with the inventive process, the fillet, the slack-sides and the sirloin steak, can first be cut loose and taken away from the leg part, for example by the operator performing the incisions, before the remainder of the leg part is transferred to said second station, in which the remaining meat on the leg part can be cut loose as an integral unit.

The pattern of the incisions need not necessarily consitute part of the invention, but constitutes an enabling disclosure for performing the inventive process.

The invention is defined in the appended claims.

In the following, embodiments of the inventive process will be described in connection with the appended drawings.

DRAWINGS

FIG. 1 illustrates schematically a cattle leg part on which dotted lines indicate a preferred incision pattern.

FIG. 2 illustrates the attachment of the pulling force in the cutting up station.

FIG. 3 illustrates a leg part, wherein additional incisions are marked in dotted lines for removal of the lower part of the leg in a variant of the inventive process, the pulling force being attached at the knee joint of the leg part.

PREFERRED EMBODIMENTS

Figure 4:
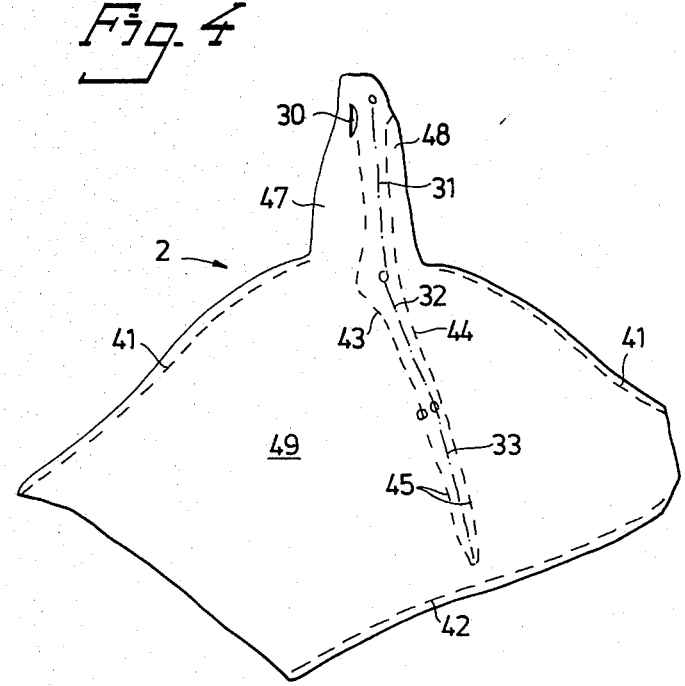
FIG. 4 illustrates schematically a cattle shoulder part and indicates the incision pattern with dotted lines.

In FIG. 1 is shown a rear cattle quarter 1. The rear quarter 1 is normally supported by a hook, not shown, inserted in the slot between the Achilles' tendon 10 and the shin-bone 11. The shin-bone 11 as well as the thigh bone 12 are indicated by dash-dot lines. The knee joint is indicated at 13.

The quarter 1 is divided between the tenth and eleventh rib. The slack-side 15 is removed by means of a cut along the line 20. Also the fillet is removed. Furthermore, the meat piece 18 on the front side of the shin-bone 11 can be cut away along line 22. Then incisions may be cut along the lines 21, 23 and 24. The incision 24 is cut along the projections of the spine and along the pelvis bone in a plane parallel to the symmetry plane of the carcass. The incision 23 is cut from the knee joint region 13 along the length of the thigh bone 12 on the front side thereof. The incision 21 is cut from the slot between the shin-bone 11 and the Achilles' tendon 10 and along the rear side of the shin-bone and on the rear side of the knee joint 13. Incisions 21 and 23 are cut in a plane at right angles to the symmetry plane.

One can now see that the sirloin 14 is still integral with the part 1 adjacent the roast beef and that the thigh meat 19 still is connected to the Achilles' tendon 10. In FIG. 1 one can also see the beef 16 and the rib portion 17 of the part 1.

The part 1, treated as above, can now be transferred to a cutting-up station, where the sirloin steak 14 can be separated from the part 1 along the surface thereof adjacent the roast beef, that is by means of a cut from the free end of line 23 to the upper bend of line 20.

In the cutting-up station, the end of the shin-bone 11 is firmly gripped to be held rigid against bending movements. Although the engagement is rigid against bending movements, it should be clear that it is preferred to have the part 1 rotatable around a vertical axis. In FIG. 2 a part 1 is shown prepared as mentioned above and with the sirloin steak 14 removed. In FIG. 2 the shin-bone end is rigidly held by gripping means, which permits rotation of the part 1 around the vertical axis, but prevents bending of the shin-bone out of the vertical. During the cutting up to be described, the part 1 is normally held also against rotation, the rotation being utilized to turn the part 1 to the most favourable position for the butcher in the cutting-up station.

Referring now to FIG. 2, a gripping means 50 is engaged just below the attachment of tendon 10 to the thigh meat 19. The means 50 is subjected to a pulling force indicated at 51, substantially in the horizontal direction. Then the tendon 10 is cut off as indicated at 25, and as the pulling force 51 is continuously applied, the thigh meat 19 is pulled away and the incisions 21, 23 and 24 are widened to make it simpler for the butcher to insert his knife and cut loose the meat from the skeleton of part 1. In fact, the entire meat mass of the part 1 as shown in FIG. 2 can be strippd from the skeleton thereof as one integral unit while the butcher cuts the meat free from the bones along the incisions mainly in the direction from the Achilles' tendon 10 downwardly out to the rib end 17 of part 1.

The pulling force 51 is preferably directed toward a conveyor (not shown) onto which the meat mass cut loose will be let down.

It should, however, be quite clear that the sirloin steak 14 could be left attached to part 1 when part 1 is transferred to the cutting-up station.

Then the gripping means 50 can be attached to the knee joint area of the sirloin steak 14 and the pulling force directed toward said conveyor can be exerted. Then the incision 23 will be widened, and the butcher can definitely cut loose the sirloin steak from the knee joint area and then also cut the sirloin steak 14 free from part 1 adjacent the roast beef. Then, the process descibed in connection with FIG. 2 could be carried out.

With reference to FIG. 3 there is illustrated an alternative process according to the invention. In that alternative embodiment, the incision 23 is extended by means of incision 26, which separates the thigh meat from the roast beef. Then, as the part 1 has been transferred to the cutting-up station, the gripping means 50 can be attached to the knee joint region 13, and a pulling force 51 can be applied to the means 50. Thereafter, the butcher can cut the sirloin steak 14 free along line 23 and along line 26. Thus the butcher can, by simple means, cut free the entire meat piece below incisions 23, 26 as one integral unit, said meat piece being laid down on the conveyor. Thus, the meat piece cut free in a first step as indicated in FIG. 3, comprises the sirloin steak 14, the roast beef, the beef 16 and the meat on the rib portion 17. Thereafter, the thigh meat 19 may be separated as indicated in FIG. 2 by engaging the means 50 at the lower attachment of the tendon 10 and cutting off tendon 10 and thereafter cutting free the thigh meat 19 along the incisions while the pulling force 51 is continuously applied to pull the thigh meat 19 onto the conveyor.

In FIG. 4 there is schematically shown a cattle shoulder part 2 comprising a forward quarter of a cattle half, the part 2 being divided after the tenth rib. The shoulder part 2 is normally supported by means of a hook inserted in the slot 30 at the upper end of the limb. While hanging in said hook, incisions 41 are cut along the breastbone and the neck in a plane parallel to the carcass symmetry plane. Incisions 42 are also cut along the spine and the neck in said plane. Moreover, incisions 43,44 and 45 are cut in a plane at right angles to said symmetry plane.

In FIG. 4 the fore knuckle-bone 31, the middle knuckle-bone 32 and the shoulder-blade 33 are indicated. Incision 44 is cut along the forward side of the knuckle-bones 31, 32 and is continued by incision 45 along the forward side of the shoulder-blade ridge 33. Incision 45 is continued along the rear side of the shoulder-blade ridge 33. Incision 43 extends along the rear side of the knuckle-bones 31,32 in a plane perpendicular to the symmetry plane.

The part 2 incised as indicated, is transferred to a cutting-up station wherein the limb end is gripped rigid against bending movement but possibly allowed to rotate around the vertical.

Figures 5, 6:
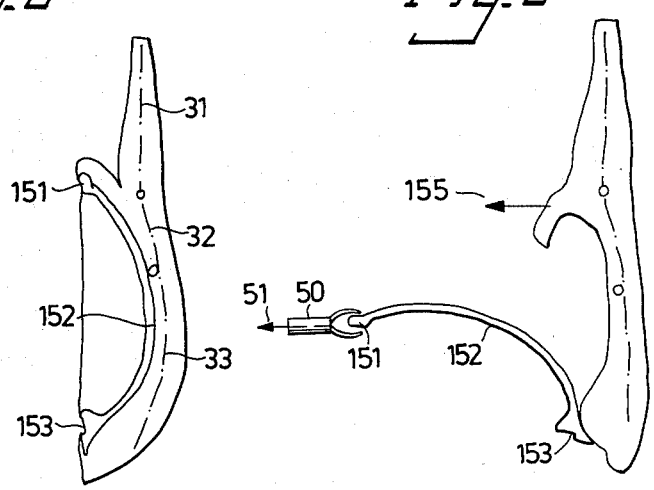
FIG. 5 illustrates schematically a cross-section of the shoulder part shown in FIG. 4.
FIG. 6 illustrates cutting away of the rib portion of the skeleton from the shoulder part.

FIG. 5 showing a schematical section of part 2 illustrates the breastbone 151, the ribs 152 and the spine half 153. FIG. 6 shows how a gripping means 50 may be attached to the breastbone 151 in a mid portion thereof and how horizontal pulling force 51 directed toward a conveyor is exerted. While exerting such a pulling force, the butcher in the cutting-up station now cuts the ribs 152 and the spine 153 free from the remainder of part 2 as illustrated. In the cutting away operation illustrated in FIG. 6, all the skeleton of part 2 exclusive of the knuckle-bones and shoulder-blade are removed from part 2. Thereafter, in the cutting-up station, the cut free meat is gripped at the breastbone edge at the central portion thereof as indicated by 155 in FIG. 6, and the entire meat mass of the part 2 exclusive of the meat piece 47 illustrated in FIG. 4 may be separated as an integral piece, just by the butcher widening the incisions made and cutting off the meat in the elbow region of part 2.

What is claimed is:

1. In a process for coarse cutting-up of a carcass part comprising a limb, such as a shoulder part or a leg part, comprising separating a meat piece from a skeleton portion of the carcass part, wherein the meat piece comprises a major portion of the meat mass on the carcass part, the improvement including the steps of
    gripping the foot-end of the limb and holding it against bending,
    making incisions in the carcass part in a pattern adapted for the part while the part is being gripped,
    cutting the meat piece away from the skeleton portion while the limb is held against bending, and
    gripping the meat piece and subjecting it to a pulling force away from the carcass part during the cutting operation.

2. A process according to claim 1 wherein the incisions are cut in a first work station, the incised hanging part is transferred to a second work station for cutting loose of the meat piece, and the carcass part is rigidly gripped at the foot-end of the limb in the second station.

3. A process according to claim 1 wherein the pulling force is directed toward a conveyor and the meat piece is transferred to the conveyor by means of the pulling force.

4. A method according to claim 1 for cutting up of a shoulder part, wherein the skeleton portion is cut away from the shoulder part before separation of the meat piece from the shoulder part, the skeleton portion being gripped in the region of the vertically upper part thereof and subjected to a pulling force away from the shoulder part during the cutting away operation.

5. A process according to claim 4 wherein the pulling force is directed toward a conveyor and the skeleton portion is transferred to the conveyor by means of the pulling force.

6. A process according to claim 1 for cutting up of a leg portion substantially comprising a rear portion of a symmetrically cleaved carcass half, wherein the incisions are cut along the pelvis bone and the spine projections in a first plane substantially in parallel with the plane of symmetry, along opposite sides of the shin-bone in a second plane substantially at right angles to the symmetry plane and along the forward surface of the thigh bone in the second plane, the pulling force being brought to engage the region of the vertically lower attachment of the Achilles' tendon whereafter the Achilles' tendon is cut off and the meat piece is cut loose from the skeleton portions of the carcass part, beginning from above and proceeding vertically downwardly.

7. A process according to claim 6 wherein incisions are cut in the second plane at the rear side of the knee joint and along the rear side of the thigh bone, and, in the second station, an integral meat piece comprising at least the sirloin steak and the roast beef is cut loose, the pulling force being attached to the knee joint portion of the meat piece and the cutting loose being performed beginning from the knee joint region and proceeding vertically downwardly.

8. A process according to claim 4 for cutting up of a shoulder part substantially comprising a forward portion of a symmetrically cleaved carcass half wherein the incisions are cut along the spine projections and the breastbone and the neck in a first plane substantially in parallel with the symmetry plane, along opposite sides of the fore knuckle-bone and middle knuckle-bone in a second plane substantially at right angles to the symmetry plane, and along opposite sides of the cam-shaped exterior ridge on the shoulder-blade in said second plane, the pulling force being attached at a central portion of the breastbone and the breastbone, ribs, spine and neck column are separated from the carcass part in the shape of an integral skeleton portion, the loose cut meat piece is then gripped at the breastbone edge in a central area thereof and subjected to the pulling force, and the meat piece cut away from said skeleton portion and the meat piece located on the forward side of the middle knuckle-bone are cut loose from the knuckle-bones in an integral unit.

9. A process according to claim 6 wherein the meat piece comprises the major portion of the meat mass of the leg part exclusive of fillet, slack sides and sirloin steak, said meat piece being cut loose as an integral unit.

* * * * *